(Model.)

F. M. FLOYD.
BAND CUTTER AND FEEDER FOR THRASHING MACHINES.

No. 246,739. Patented Sept. 6, 1881.

Inventor
Francis M. Floyd.
By C. M. Alexander,
his Atty.

Witnesses

UNITED STATES PATENT OFFICE.

FRANCIS M. FLOYD, OF CENTRALIA, ILLINOIS.

BAND-CUTTER AND FEEDER FOR THRASHING-MACHINES.

SPECIFICATION forming part of Letters Patent No. 246,739, dated September 6, 1881.

Application filed June 11, 1881. (Model.)

*To all whom it may concern:*

Be it known that I, FRANCIS M. FLOYD, of Centralia, in the county of Marion, and in the State of Illinois, have invented certain new and useful Improvements in Band-Cutters and Feeders for Thrashing-Machines; and I do hereby declare that the following is a full, clear, and exact description thereof, reference being had to the accompanying drawings, and to the letters of reference marked thereon, making a part of this specification.

This invention relates to an improved band-cutter and feeder for thrashing-machines; and it has for its objects to provide an apparatus by means of which the grain will be fed to the machine and the bands which bind the sheaves cut as they are fed, in the manner more fully hereinafter specified. These objects I attain by the apparatus illustrated in the accompanying drawings, in which—

Figure 1:
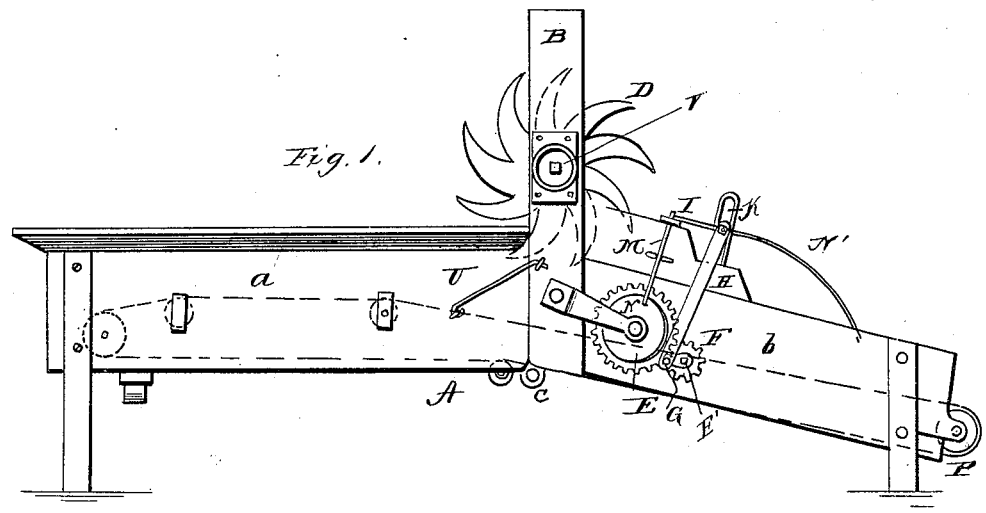
Figure 2:
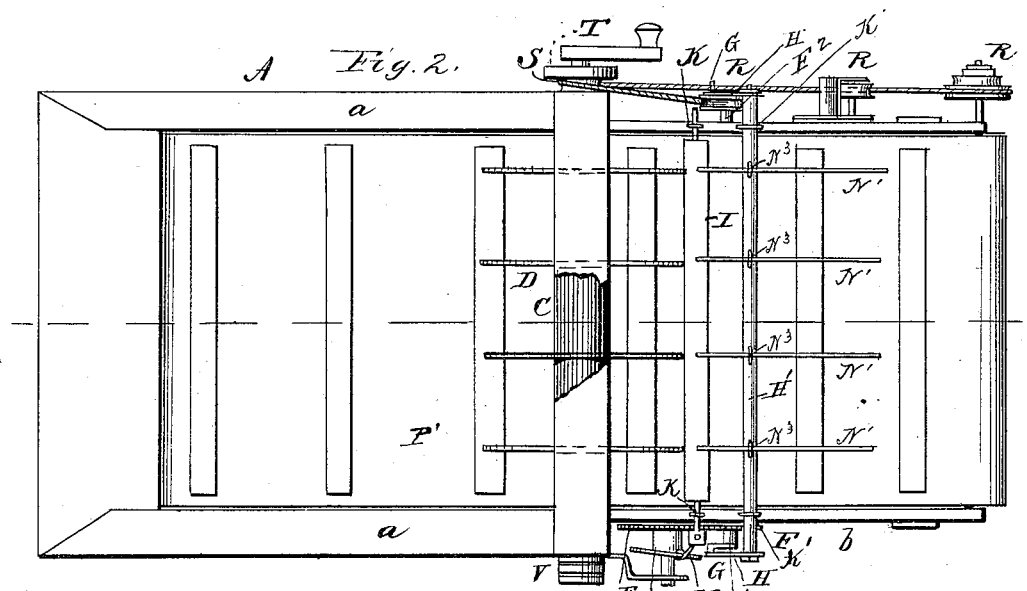
Figure 3:
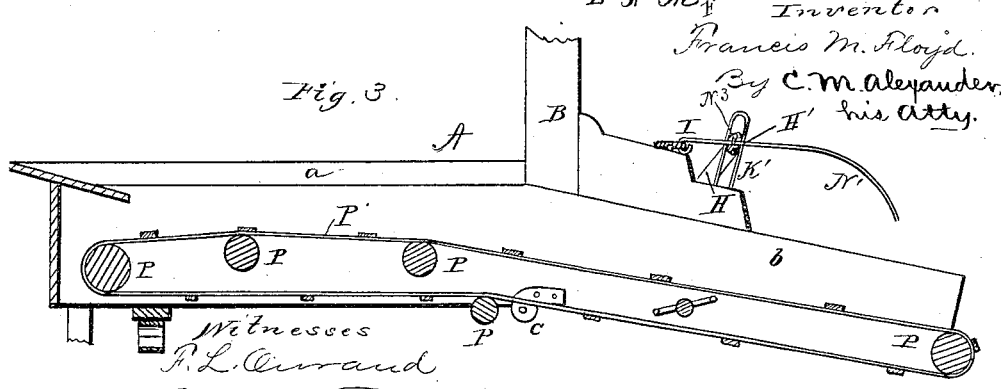

Figure 1 represents a side elevation of my apparatus; Fig. 2, a top view, and Fig. 3 a longitudinal vertical section, of the same.

The letter A indicates the feeder, constructed in two parts, $a$ and $b$, hinged together at $c$, in order that they may be folded together for transportation. The said feeder is provided with uprights B, in which are journaled the ends of a shaft, C, carrying a series of curved blades or cutters, D.

The letter E indicates a cog-wheel, mounted on a shaft journaled in suitable bearings at one side of the apparatus and gearing with a pinion, F, which is mounted on the journal of a shaft, F', at one end, the other journal being provided with a pulley, F². The said pinion and pulley are provided with wrist-pins G, which connect by means of rods H with a vertically-reciprocating bar, H', moving in ways K' at the sides of the apparatus.

The letter I indicates a transversely-reciprocating rock-shaft, journaled in bearings K at the sides of the feeder. The said shaft is capable of a transverse movement in its bearings, and is provided with an arm, M, which engages a cam, N, on the cog-wheel shaft, which serves to impart the longitudinal movement to said rock-shaft.

The letter N' indicates a series of fingers pivoted to the rock-shaft. The said fingers pass loosely through the links N³ on the bar H', so that as the rock-shaft is moved transversely they will oscillate in said links laterally, while they will be reciprocated vertically by the bars H H.

The letter P indicates a series of rollers, over which an endless carrier-belt, P', travels. Motion is imparted to the rollers and cog-gearing by means of the pulleys R and the belt or cord S, passing around them and a pulley, T, on the main shaft of the apparatus.

The letter U indicates a hook, by means of which the parts $a$ and $b$ are held in working position. The part $b$ is secured to the forward end of the harvester, and the part $a$ is supported by means of its legs upon the ground.

The letter V indicates a pulley on the main driving-shaft, which receives motion by means of a suitable belt from the driving mechanism of the thrashing-machine.

Having thus described my invention, what I claim, and desire to secure by Letters Patent, is—

The combination, in a band-cutter and feeder for thrashing-machines, of the cog-wheel journaled at one side of the frame, with the transverse shaft provided with an intermeshing pinion at one end and a pulley at the opposite end, the wrist-pins attached to the pinion and pulley, the links and vertically-reciprocating bar, the fingers loosely attached to said bar, and the rock-shaft and mechanism for moving it, substantially as specified.

In testimony whereof I affix my signature, in presence of two witnesses, this 31st day of May, 1881.

FRANCIS M. FLOYD.

Witnesses:
 JOHN W. DICKERSON,
 REUBEN J. SCOTT.